United States Patent Office 3,131,086
Patented Apr. 28, 1964

3,131,086
THERMOSETTING AMINO-PHENOPLAST RESINS
Arthur S. Nyquist, Darien, and Arnold D. Myers, Wallingford, Conn., assignors to American Cyanamid Company, New York, N.Y., a corporation of Maine
No Drawing. Filed Jan. 4, 1962, Ser. No. 164,415
13 Claims. (Cl. 117—138.8)

This invention relates to a novel method of imparting resistance to stains, particularly those made by coffee and tea, to heat- and pressure-consolidated articles prepared from aminoplast resinous compositions. This invention also relates to the novel stain-resistant articles, such as molded tableware articles, produced according to our novel method, and further relates to the stain-retarding compositions used in preparing such articles.

The many excellent properties possessed by aminoplast resins, and in particular by aminotriazine-aldehyde resins such as melamine-formaldehyde resins, have led to their widespread use in the molding and laminating fields. More particularly, these thermo setting or heat-hardenable resins possess, in the cured or thermoset state, superior break-resistance, resistance to water and other solvents, to softening or other internal heat-failures, to cracking when exposed to electrical stress, and to surface failures such as loss of gloss, discoloration or crazing due to heat and light, all of which features render them especially suitable for the preparation of heat- and pressure-consolidated molded and laminated articles.

However, heat- and pressure-consolidated articles such as laminated table, counter and bar tops, molded cups, saucers, plates, and the like, prepared from conventional thermosetting aminoplast resins such as melamine-formaldehyde resinous condensates do possess one deficiency which detracts from their overall excellence. Articles of this type are susceptible to various kinds of stains. Coffee and tea are among the worst offenders in this respect, but other substances, for example, the juices of various fruits and vegetables, such as raspberry, grape, and beet juices, to mention just a few, soft drinks (e.g., cola drinks), cocoa, and the like, also leave stains which detract from the appearance, although not the durability, of such molded and laminated articles, and which are difficult to remove even if attended to immediately.

This propensity of conventionally prepared heat- and pressure-consolidated aminoplast resin-containing laminated and molded articles for staining has limited, in many cases, the extent to which such articles have found acceptance in many important areas of everyday use. For example, many people, and especially restaurateurs and other large-volume users of dinnerware, have been reluctant to replace chinaware with high-quality tableware made from thermosetting melamine-formaldehyde resinous compositions, despite the latter's many obviously superior properties.

We have now discovered that thermosetting aminoplast resinous compositions comprising resinous reaction products of (A) an aminotriazine containing at least two amidogen groups, each having at least one aldehyde-reactable hydrogen atom attached to the amidogen nitrogen atom, e.g., melamine, (B) an aldehyde, e.g., formaldehyde, and (C) an aldehyde-reactable para-substituted monohydric phenol, i.e., p-phenyl phenol, when applied to the surfaces of heat- and pressure-consolidated cured or partially cured articles prepared from conventional thermosetting aminoplast resinous compositions, such as melamine-formaldehyde resinous compositions, and cured thereon to a substantially insoluble and infusible state by means of an acid curing catalyst, impart substantial stain-resistance to said articles.

It is, therefore, an object of our invention to provide a novel method of imparting stain-resistance to heat- and pressure-consolidated articles prepared from thermosetting aminoplast resinous compositions, particularly those prepared from melamine-formaldehyde resinous compositions.

It is also an object of our invention to prepare heat- and pressure-consolidated articles from thermosetting aminoplast resinous compositions, and particularly from melamine-formaldehyde resinous compositions, wherein the surfaces of said articles have been provided with a substantially insoluble and infusible adherent coating which is resistant to staining by common foods and beverages.

A further object of our invention is to provide stain-retardant compositions of matter useful in imparting stain-resistance to heat- and pressure-consolidated articles prepared from thermosetting aminoplast resinous compositions, particularly those prepared from melamine-formaldehyde resinous compositions.

These and other objects of our invention will be discussed more fully hereinbelow.

The thermosetting aminoplast resinous compositions employed in the practice of the present invention, which may also be designated as potentially stain-retardant compositions, comprise, as indicated above, resinous reaction products of compounds tken from each of three essential classes of components. The first two of these classes, i.e., aminotriazines containing at least two amidogen groups, each having at least one aldehyde-reactable hydrogen atom attached to the amidogen nitrogen atom, and aldehydes reactable therewith as well as with the third essential component, namely, the aldehyde-reactable para-substituted monohydric phenol, have been disclosed in great detail in the prior art in connection with the preparation of conventional thermosetting aminoplast resinous compositions. For example, comprehensive disclosures of such compounds may be found in U.S. Patents Nos. 2,197,357; 2,310,004 and 2,328,592 to Widmer et al.

Melamine is the preferred aminotriazine reactant for use in preparing the potentially stain-retardant resinous reaction products of the present invention, but other aminotriazines, e.g., mono-, di- and tri-substituted melamine, such as the mono-, di- and trimethylmelamines, and the like, or guanamines, such as formoguanamine, acetoguanamine, benzoguanamine, and the like, may be employed in addition to or instead of melamine.

Similarly, formaldehyde is the preferred aldehyde reactant, but other aldehydes, and particularly monoaldehydes such as acetaldehyde, propionaldehyde, butyraldehyde, benzaldehyde, and the like, or compounds engendering aldehydes, e.g., paraformaldehyde, hexamethylenetetramine, and the like, may be employed in addition to or instead of formaldehyde.

The aldehyde-reactable para-substituted monohydric phenols which are used in preparing the potentially stain-retardant compositions of the present invention are represented by the general formula:

wherein R represents a hydrocarbon substituent, i.e., an alkyl group, either straight- or branched-chain, having from 1 to 6 carbon atoms, inclusive, such as methyl, propyl, n-butyl, t-butyl, hexyl, and the like, an aryl group, such as phenyl, tolyl, xylyl, and the like, or an aralkyl group, such as benzyl and the like. Thus, included among such aldehyde-reactable para-substituted monohydric phenols are p-methyl phenol, p-propyl phenol, p-n-butyl phenol, p-t-butyl phenol, p-phenyl phenol, p-benzyl phenol, and the like.

The thermosetting aminoplast resinous reaction products of the present invention can be prepared by a variety of methods, since the order in which the three essential components are combined is not critical. For example, the reactants, e.g., melamine, p-phenyl phenol and formaldehyde, can be mixed together and then co-reacted, in the presence of a basic catalyst, preferably a strong base, e.g., an alkali metal hydroxide such as sodium or potassium hydroxide, an alkaline earth metal hydroxide such as barium or calcium hydroxide, a tertiary amine, such as triethylamine or triethanolamine, or a quaternary ammonium hydroxide, such as tetramethylammonium hydroxide, and the like. The amount of basic catalyst employed will range from about 0.0025 to about 0.015 molar equivalents per mol of aldehyde-reactable para-substituted monohydric phenol present in the reaction mixture.

One particularly suitable method of effecting such co-reaction is in a resinous melt. When employing this technique, the reactants will preferably, although not necessarily, be introduced as substantially dry solids, e.g., when formaldehyde is the aldehyde reactant, it will preferably be furnished by using an equivalent amount of paraformaldehyde, and the reaction will be carried out under conditions such that the reactants will fuse and co-react. Thus, in the case of a melamine/p-phenyl phenol/formaldehyde resinous melt, co-reaction will be effected by heating the reaction mixture to a temperature above about 60° C. to fuse the reactants and then reacting the resulting melt at a temperature of from about 80° C. to about 160° C. until a resinous reaction product having a softening point of from about 80° C. to about 120° C. is obtained This end point can be determined by periodically withdrawing small (0.1 gram) samples of the reaction mixture, once it has become substantially homogeneous, cooling the samples, crushing the cooled samples to a fine powder, and determining the softening point of the powder by any suitable method. One such method is to dust the powdered sample on a Dennis melting point bar, an electrically heated metal bar having graduated zones of increasing temperatures, and observe the temperature at the point on the bar to which the sample sticks when retained thereon for ten seconds.

The thermosetting aminoplast resinous reaction products obtained by this technique are, in general, viscous liquids at the temperatures at which they are formed and hard, brittle resins at room temperature. Thus, they may be solidified by allowing them to cool, e.g., to room temperature (about 25° C.), before they are further processed, or they may be used in the liquid state without first being solidified.

Another suitable method of effecting co-reaction of the three essential components involves reacting them in the form of an aqueous solution or dispersion. This may be accomplished, for example, by mixing the aldehyde-reactable para-substituted monohydric phenol and the aminotriazine with an aqueous solution or dispersion of the aldehyde, reacting the resulting reaction mixture in the presence of a basic catalyst at a temperature ranging from about 80° C. to reflux temperature, i.e., about 100° C., for from about 15 minutes to about 45 minutes, and then separating the resinous reaction product, e.g., by spray drying or vacuum concentrating the reacted solution or dispersion or by allowing it to cool to room temperature and then letting it stand until the reaction product precipitates.

Other methods besides co-reaction of the three essential components may also be employed in preparing these thermosetting aminoplast resinous reaction products. For example, the aldehyde-reactable para-substituted monohydric phenol may be co-reacted, in the presence of a basic catalyst, with the aldehyde and a previously prepared aminotriazine-aldehyde resinous condensate, or the aminotriazine may be co-reacted with the aldehyde and an aldehyde-reactable para-substituted monohydric phenol-aldehyde resinous condensate which had previously been prepared in the presence of a basic catalyst. In addition, the aminotriazine and the aldehyde-reactable para-substituted monohydric phenol may be separately reacted, the latter in the presence of a basic catalyst, with the aldehyde, and the resulting resinous condensates then co-reacted.

The mol ratios of the three essential reactants making up the aminotriazine/aldehyde-reactable para-substituted monohydric phenol/aldehyde resinous reaction products of the present invention can be varied to a considerable extent. Thus, the mol ratio of aminotriazine to aldehyde-reactable para-substituted monohydric phenol can range from about 3:1 to about 1:3, preferably from about 2:1 to about 1:2, respectively, while the mol ratio of aldehyde to the total mols of aminotriazine and aldehyde-reactable para-substituted monohydric phenol present can range from about 1:1 to about 3:1, preferably from about 1.5:1 to about 2.25:1, respectively.

As previously indicated, the potentially stain-retardant compositions of the present invention will be formulated as coating compositions which will be used to coat the surfaces of cured or partially cured molded articles prepared from conventional thermosetting aminoplast resinous compositions. Coating compositions can be conventionally prepared using the thermosetting aminotriazine/aldehyde-reactable para-substituted monohydric phenol/aldehyde resins in either solid or liquid form. For example, a given quantity of solid resin may be granulated, then admixed with an acid catalyst and any other desired additives, and the resulting mixture pulverized, e.g., by ball milling, to a fine powder. Similarly, the catalyst, alone or together with any other desired additives, can be added to a given quantity of the resin in liquid form, e.g., as a solution in a suitable solvent.

Among the acid catalysts used to facilitate the cure of these thermosetting resinous coating compositions are mineral acids, such as phosphoric acid and the like, and organic acids, such as phthalic acid or its anhydride, p-toluenesulfonic acid, benzenesulfonic acid, benzoic acid, and the like. The optimum curing conditions are modified to some extent by the choice of a particular catalyst. In general, however, these acid curing catalysts can be employed in amounts ranging from about 0.05% to about 2% by weight, based on the total weight of the thermosetting aminotriazine/aldehyde-reactable para-substituted monohydric phenol/aldehyde resin present.

Besides the acid curing catalyst, various other additives may be incorporated in our thermosetting coating compositions. For example, no colorant need be used in these coating compositions, but if it is desired to produce colored coatings a wide variety of pigments, dyes and colorants of all descriptions may be employed. In addition, conventional mold lubricants, such as zinc stearate, glyceryl monostearate, and the like, may also be incorporated into the coating compositions.

A number of suitable methods may be employed in applying the potentially stain-retardant coating compositions of the present invention to the surfaces of cured or partially cured molded articles prepared from conventional thermosetting aminoplast resinous compositions. One particularly suitable method may be termed overglaze molding, and will be best understood by first briefly considering the procedure customarily followed in the conventional methods of preparing thermosetting aminoplast resinous compositions, such as melamine-formaldehyde resinous compositions, and using such compositions to prepare heat- and pressure-consolidated molded articles.

The thermosetting aminoplast resins employed in the usual commercial molding practices are synthetic resins prepared by the condensation reaction of an amino (including imino) or amido (including imido) compound with an aldehyde. Resinous condensates of this type, as well as methods for their preparation, have been shown innumerable times in the prior art, and adequate disclosures of them may be found, for example, in the Widmer et al. patents mentioned hereinabove. The present invention is concerned particularly with the treatment of molded articles prepared from aminoplast resins of the type wherein one or more aminotriazines containing at least two amidogen groups, each having at least one aldehyde-reactable hydrogen atom attached to the amidogen nitrogen atom, e.g., melamine, have been reacted with an aldehyde, such as formaldehyde, to yield a potentially thermoset resinous condensate, i.e., one which has been carried to an intermediate stage of condensation whereby it remains as a resinous material soluble or readily dispersible in aqueous systems while also remaining capable of being converted, under suitable conditions of heat and pressure, to a substantially insoluble and infusible form. Thus, the aminotriazines and aldehydes mentioned hereinabove in connection with the preparation of the thermosetting aminotriazine/aldehyde-reactable para-substituted monohydric phenol/aldehyde resins, and in particular melamine and formaldehyde, are among the reactants which may be employed in preparing these conventional aminoplast resinous condensates, with the properties desired in the condensates and in molded articles prepared therefrom as well as economic considerations being among the factors upon which the choice of the particular aminotriazine and aldehyde will depend.

The mol ratio of aldehyde to aminotriazine in these resinous condensates is not critical, and may be within the order of from about 1.5:1 to about 4:1, respectively, depending on the nature of the starting materials and the characteristics desired in the final product, but it is preferred that the mol ratio be within the order of from about 2:1 to about 3:1, respectively. Similarly, the reaction conditions conventionally followed in preparing these resinous condensates may be varied to a considerable extent, i.e., the aldehyde and aminotriazine may be heat-reacted at temperatures ranging from about 40° C. to reflux temperature, i.e., about 100° C., for periods of time ranging from about 30 to about 120 minutes, at a pH ranging from about 6.5 to about 10, either by themselves or in an aqueous medium.

Other amido or imido compounds besides the aminotriazines may be reacted with an aldehyde to provide the thermosetting aminoplast resins used in preparing the heat- and pressure-consolidated articles treated in accordance with the present invention. Among them there are included urea and those of its derivatives which have been commonly used in the preparation of thermosetting aminoplast resinous compositions, such as for example, the alkylureas, e.g., mono- and dimethylurea, haloureas, and the like.

In general, molding compositions are prepared from thermosetting aminoplast resins by first impregnating a fibrous filler, such as chopped α-cellulose, with the resin in syrup form, drying the impregnated material to a low volatile content, usually in the order of about 8% or less, converting the dried material to a fine, fluffy powder while blending it with various commonly employed additives, such as curing catalysts, pigments, mold lubricants, and the like, and finally densifying and granulating the powdered molding composition, thus converting it to a form especially suited for commercial molding techniques.

In such techniques, the common practice is to first shape the granular molding composition into a pre-formed article which approximates the shape the article will assume in its final form. This pre-forming step may be carried out either in a press or mold specifically designed for pre-forming or in a conventional molding press, either with or without the application of heat, to result in a pre-formed article whose resin content either remains uncured or becomes only partially cured, thus providing for the subsequent application of a decorative overlay, if desired. Decorative overlays comprising a single sheet or foil of high grade α-cellulose paper or similar fibrous material impregnated with a thermosetting aminoplast resin of the type found in the pre-form and imprinted with an ornamental design are usually employed to provide a decorative effect to relatively flat molded pieces, such as dinner plates, saucers, and the like, and are ordinarily not used with deep-draw molded articles such as cups, bowls, and the like. The pre-formed article is of a somewhat porous nature, and should contain slightly more resinous material than will be retained by the article when it assumes its final molded form. This is to insure that the mold used in the final molding operation will be substantially filled, with the usual provision being made for a small amount of flashing.

Ordinarily, the pre-formed article, either with or without a decorative overlay, is then placed in a molding press and molded, under suitable conditions of heat and pressure, to its final molded form. The overglaze molding technique employed in preparing aminoplast molded articles coated with the stain-resistant compositions of the present invention represents a slight departure from this common practice, in that the pre-formed article is first molded under suitable conditions of heat and pressure until the point is reached at which, for the first time, the degree of cure accomplished is such that the mold can be opened without damaging the article being molded or having it stick to the opening portion of the mold. An article which has reached this degree of cure can be termed a pre-molded article. The time required to reach this point in the curing cycle will depend on many factors, e.g., the design of the mold, the nature of the composition being molded, the temperatures and pressures used, etc., and will vary to some extent for each different molding operation encountered, but in general it will usually be about 30 seconds or more after the start of the molding cycle. At this point, the mold is opened and the required amount of our potentially stain-retardant composition, either in powdered form or as a solution, i.e., an amount sufficient to ultimately produce a thermoset coating of a desired thickness on the surfaces being treated, is placed on the pre-molded article. Then, the mold is again closed, heat and pressure are applied, and the curing of both the pre-molded article and the potentially stain-retardant composition is carried to substantial completion.

The potentially stain-retardant compositions of the present invention may also be applied to the surfaces of conventional aminoplast molded articles as solutions in inert organic solvents. Highly polar organic solvents are preferred, among which there are included dioxane, Cellosolve acetate, dimethylformamide, dimethyl acetamide, dimethyl sulfoxide, and the like. Mixtures of such solvents may also be employed, and, in some instances, will even be preferred.

The relative amounts of solvent and thermosetting aminotriazine/aldehyde-reactable para-substituted monohydric phenol-aldehyde resin employed may be varied over a wide range, depending on the viscosity desired in the coating composition, which in turn will depend on the method employed in applying the composition to the surfaces to be treated. For instance, if the composition is to be applied using a doctor knife or similar spreading means, relatively viscous solutions or, in some cases, almost paste-like materials, will be prepared. In such cases, relatively small amounts of solvent are needed. If, on the other hand, the composition is to be applied by spraying, by brush- or roller-coating, or by dipping the article being treated therein, larger amounts of solvent will be employed. In general, the amount of solvent employed will be such that the thermosetting resin will be present in solution at a solids content ranging from about 5% to about 95% by weight.

Where solutions of our potentially stain-retardant compositions are formulated for use in dip-, flow-, brush- or roller-coating heat- and pressure-consolidated aminoplast articles it may be desirable, in certain instances, to add to such solutions minor amounts, e.g., amounts ranging from about 0.1 to about 1 part by weight, based on the total weight of the solution, of conventional leveling agents, such as butylated melamine-formaldehyde resins, buylated urea-formaldehyde resins, silicone oils, and the like, in order to counteract any possible tendency towards cratering or pinholing in the final thermoset coating. Ordinarily, this expedient will not be necessary where solutions of our potentially stain-retardant compositions are applied using conventional spray-coating techniques.

Following the application of a solution of the potentially stain-retardant composition, the coated article is first dried to evaporate the inert solvent, e.g., by air-drying at room temperature, and then heat-treated at temperatures ranging from about 110° C. to about 150° C. for from about 5 minutes to about 30 minutes to cure the thermosetting coating to a substantially insoluble, infusible, stain-resistant form. The drying time prior to this heat-treatment may be accelerated if desired, e.g., by the use of a suitable drying apparatus or by applying the coated composition to the heat- and pressure-consolidated aminoplast article as it comes from the mold.

Coatings of the potentially stain-retardant compositions may be applied to heat- and pressure-consolidated aminoplast resin articles in a wide range of thicknesses, inasmuch as stain-resistance can be obtained from coatings of a fraction of a mil in thickness. The thickness of a particular coating applied by any suitable method, including those described hereinabove, can be regulated by many factors, including those inherent in the particular coating process itself. For example, in the case of coatings applied from solution, such factors include the viscosity of the treating solution and the time of contact. Depending on the degree of abrasion resistance required in the coated article, coatings of from about 0.2 to about 1.0 mil or higher will usually be applied.

In order that those skilled in the art may more fully understand the inventive concept presented herein, the following examples are set forth. These examples are given solely by way of illustration and should not be considered as expressing limitations unless so set forth in the appended claims. All parts and percentages are by weight, unless otherwise stated.

*Example I*

170.2 parts of p-phenyl phenol, 126 parts of melamine, 120 parts of formaldehyde (added as 91% paraformaldehyde) and 15 parts of a 0.5 N aqueous sodium hydroxide solution were charged to a suitable reaction vessel equipped with thermometer and stirrer. The temperature of the reaction mixture was raised, while stirring, to 130° C. within a fifteen minute period. The reaction mixture was then held at 130° C. for an additional fifteen minutes. During the reaction period the substantially dry reactants first fused and then co-reacted, forming a viscous resinous mass. At the end of the reaction period this resinous mass was discharged from the reaction vessel onto aluminum foil and allowed to cool to room temperature. Upon cooling, the reaction product solidified to a light-colored, hard, friable resin having a melting point, measured on a Dennis melting point bar, of between 80° C. and 90° C.

The cooled resin was prepared for use as an overglaze composition by first passing it through a granulating mill and then ball milling the resulting coarse ground resin, together with 0.3 part of phthalic anhydride per hundred parts of resin, for thirty minutes.

*Example II*

The required amount of a commercially available α-cellulose-filled melamine-formaldehyde molding composition was charged to the cavity of a standard dinner plate mold. The mold was closed and the charge was partially cured by molding at 165° C. under a pressure of 3000 p.s.i. for one minute. The mold was then opened and 2.5 parts of the overglazing composition prepared in Example I were charged to the upper surface of the pre-molded plate. The mold was again closed and the over- glazed plate was cured at 165° C. under a pressure of 3000 p.s.i. for one minute. The cured plate was then removed from the mold and allowed to cool to room temperature. It had a hard, lustrous upper surface which was resistant to coffee-staining, as was demonstrated by subjecting the plate to an accelerated coffee-staining test conducted in the following manner.

A strong brew of black coffee was prepared by dissolving 32 grams of a standard, commercially available brand of instant coffee in one liter of boiling water. The coffee solution was then cooled to 80° C. and the partially coated plate was immersed therein for a period of 144 hours, with the temperature of the coffee solution being held at 80° C. during that time. At the end of the immersion period, the plate was removed from the coffee solution, washed with soap and water and dried. The coated upper surface of the plate showed only a slight change from its original appearance, whereas the uncoated bottom surface had become heavily stained.

*Example III*

170.2 parts of p-phenyl phenol, 60 parts of formaldehyde (added as 91% paraformaldehyde) and 15 parts of a 0.5 N aqueous sodium hydroxide solution were charged to a suitable reaction vessel equipped as described in Example I and heated to a temperature of 120° C. within 70 minutes, with stirring, to obtain a melt. To this melt there were then added 126 parts of melamine, and the resulting mixture was heated, with stirring, for ten minutes at 130° C. The reaction product, a clear, viscous amber liquid, was then discharged from the reaction vessel and allowed to cool to room temperature, whereupon it solidified to a hard, brittle resin having a melting point, measured on a Dennis melting point bar, of between 85° C. and 95° C. The cooled resin was then prepared for use as an overglaze composition in the manner described in Example I, i.e., by granulating the resin and then ball milling it, together with 0.3 part of phthalic anhydride per hundred parts of resin, to give a fine, dry, catalyzed powder.

*Example IV*

The procedure of Example II was repeated in every detail with the exception that the overglaze composition employed therein was replaced by an equal amount of the overglaze composition prepared as described in Example III. The thus-prepared partially coated plate behaved in the same manner as the plate of Example II when subjected to the accelerated coffee-staining test, i.e., its coated upper surface was only slightly changed from its original appearance after immersion in the coffee solution for 144 hours at 80° C., while its uncoated bottom surface was badly stained.

*Example V*

170.2 parts of p-tert-butyl phenol, 90 parts of formaldehyde (added as 91% paraformaldehyde), 126 parts of melamine and 15 parts of a 0.5 N aqueous sodium hydroxide solution were charged to a suitable reaction vessel equipped as described in Example I, heated to 130° C. within 20 minutes, with stirring, and then held at 130° C., with stirring, for an additional 70 minutes. The viscous resinous reaction product was then discharged from the reaction vessel and allowed to cool to room temperature. Upon cooling it solidified to a hard, friable resin having a melting point, measured on a Dennis melting point bar, of approximately 80° C. The cooled resin was then prepared for use as an overglaze composition in the manner described in Example I, i.e., by granulating the resin and then ball milling it, together with 0.3 part of phthalic anhydride per hundred parts of resin, to give a fine, dry, catalyzed powder.

*Example VI*

The procedure of Example II was again repeated in every detail with the exception that the overglaze composition employed therein was replaced by an an equal amount of the overglaze composition of Example V. The partially coated plate behaved in the same manner as the plate described in Example II when subjected to the accelerated coffee-staining test, in that its coated upper surface showed only a slight change from its appearance prior to coming in contact with the coffee solution while its uncoated bottom surface, after immersion in the coffee solution for 144 hours at 80° C., was badly stained and dark brown in color.

It will be obvious to those skilled in the art that other changes and variations may be made in carrying out the present invention without departing from the spirit and scope thereof as defined in the appended claims.

We claim:

1. A heat- and pressure-consolidated article prepared from a thermosetting resinous composition selected from the group consisting of aminotriazine-aldehyde resinous compositions and urea-aldehyde resinous compositions and coated with a substantially insoluble and infusible adherent, stain-resistant coating comprising a thermoset resinous reaction product of (A) an aminotriazine containing at least two amidogen groups, each having at least one aldehyde-reactable hydrogen atom attached to the amidogen nitrogen atom, (B) an aldehyde, and (C) an aldehyde-reactable para-substituted monohydric phenol represented by the general formula:

wherein R is a member selected from the group consisting of alkyl groups having from 1 to 6 carbon atoms, inclusive, aryl groups and aralkyl groups, the mol ratio of said (A) to said (C) being from about 3:1 to about 1:3, respectively, and the mol ratio of said (B) to the total mols of said (A) and said (C) being from about 1:1 to about 3:1, respectively.

2. A heat- and pressure-consolidated article prepared from a thermosetting aminotriazine-aldehyde resinous composition and coated with a substantially insoluble and infusible adherent, stain-resistant coating comprising a thermoset resinous reaction product of (A) an aminotriazine containing at least two amidogen groups, each having at least one aldehyde-reactable hydrogen atom attached to the amidogen nitrogen atom, (B) an aldehyde, and (C) an aldehyde-reactable para-substituted monohydric phenol represented by the general formula:

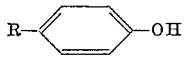

wherein R is a member selected from the group consisting of alkyl groups having from 1 to 6 carbon atoms, inclusive, aryl groups and aralkyl groups, the mol ratio of said (A) to said (C) being from about 3:1 to about 1:3, respectively, and the mol ratio of said (B) to the total mols of said (A) and said (C) being from about 1:1 to about 3:1, respectively.

3. A heat- and pressure-consolidated article prepared from a thermosetting melamine-formaldehyde resinous composition and coated with a substantially insoluble and infusible adherent, stain-resistant coating comprising a thermoset resinous reaction product of (A) an aminotriazine containing at least two amidogen groups, each having at least one aldehyde-reactable hydrogen atom attached to the amidogen nitrogen atom, (B) an aldehyde, and (C) an aldehyde-reactable para-substituted monohydric phenol represented by the general formula:

wherein R is a member selected from the group consisting of alkyl groups having from 1 to 6 carbon atoms, inclusive, aryl groups and aralkyl groups, the mol ratio of said (A) to said (C) being from about 3:1 to about 1:3, respectively, and the mol ratio of said (B) to the total mols of said (A) and said (C) being from about 1:1 to about 3:1, respectively.

4. A heat- and pressure-consolidated article prepared from a thermosetting urea-aldehyde resinous composition and coated with a substantially insoluble and infusible adherent, stain-resistant coating comprising a thermoset resinous reaction product of (A) an aminotriazine containing at least two amidogen groups, each having at least one aldehyde-reactable hydrogen atom attached to the amidogen nitrogen atom, (B) an aldehyde, and (C) an aldehyde-reactable para-substituted monohydric phenol represented by the general formula:

wherein R is a member selected from the group consisting of alkyl groups having from 1 to 6 carbon atoms, inclusive, aryl groups and aralkyl groups, the mol ratio of said (A) to said (C) being from about 3:1 to about 1:3, respectively, and the mol ratio of said (B) to the total mols of said (A) and said (C) being from about 1:1 to about 3:1, respectively.

5. A heat- and pressure-consolidated article prepared from a thermosetting urea-formaldehyde resinous composition and coated with a substantially insoluble and infusible adherent, stain-resistant coating comprising a thermoset resinous reaction product of (A) an aminotriazine containing at least two amidogen groups, each having at least one aldehyde-reactable hydrogen atom attached to the amidogen nitrogen atom, (B) an aldehyde, and (C) an aldehyde-reactable para-substituted monohydric phenol represented by the general formula:

wherein R is a member selected from the group consisting of alkyl groups having from 1 to 6 carbon atoms, inclusive, aryl groups and aralkyl groups, the mol ratio of said (A) to said (C) being from about 3:1 to about 1:3, respectively, and the mol ratio of said (B) to the total mols of said (A) and said (C) being from about 1:1 to about 3:1, respectively.

6. A heat- and pressure-consolidated article prepared from a thermosetting melamine-formaldehyde resinous composition and coated with a substantially insoluble and infusible adherent, stain-resistant coating comprising a thermoset resinous reaction product of (A) melamine, (B) formaldehyde, and (C) p-phenyl phenol, the mol ratio of said (A) to said (C) being from about 3:1 to about 1:3, respectively, and the mol ratio of said (B) to the total mols of said (A) and said (C) being from about 1:1 to about 3:1, respectively.

7. A heat- and pressure-consolidated article prepared from a thermosetting melamine-formaldehyde resinous composition and coated with a substantially insoluble and infusible adherent, stain-resistant coating comprising a thermoset resinous reaction product of (A) melamine, (B) formaldehyde, and (C) p-t-butyl phenol, the mol ratio of said (A) to said (C) being from about 3:1 to about 1:3, respectively, and the mol ratio of said (B) to the total mols of said (A) and said (C) being from about 1:1 to about 3:1, respectively.

8. A heat- and pressure-consolidated article prepared from a thermosetting urea-formaldehyde resinous composition and coated with a substantially insoluble and infusible adherent, stain-resistant coating comprising a thermoset resinous reaction product of (A) melamine, (B) formaldehyde, and (C) p-phenyl phenol, the mol ratio of said (A) to said (C) being from about 3:1 to about 1:3, respectively, and the mol ratio of said (B) to the total mols of said (A) and said (C) being from about 1:1 to about 3:1, respectively.

9. A heat- and pressure-consolidated article prepared from a thermosetting urea-formaldehyde resinous composition and coated with a substantially insoluble and infusible adherent, stain-resistant coating comprising a thermoset resinous reaction product of (A) melamine, (B) formaldehyde, and (C) p-t-butyl phenol, the mol ratio of said (A) to said (C) being from about 3:1 to about 1:3, respectively, and the mol ratio of said (B) to the total mols of said (A) and said (C) being from about 1:1 to about 3:1, respectively.

10. A heat- and pressure-consolidated article prepared from a thermosetting melamine-formaldehyde resinous composition and coated with a substantially insoluble and infusible adherent, stain-resistant coating comprising a thermoset resinous reaction product of (A) melamine, (B) formaldehyde, and (C) p-phenol, the mol ratio of said (A) to said (C) being from about 2:1 to about 1:2, respectively, and the mol ratio of said (B) to the total mols of said (A) and said (C) being from about 1.5:1 to about 2.25:1, respectively.

11. A heat- and pressure-consolidated article prepared from a thermosetting melamine-formaldehyde resinous composition and coated with a substantially insoluble and infusible adherent, stain-resistant coating comprising a thermoset resinous reaction product of (A) melamine, (B) formaldehyde, and (C) p-t-butyl phenol, the mol ratio of said (A) to said (C) being from about 2:1 to about 1:2, respectively, and the mol ratio of said (B) to the total mols of said (A) and said (C) being from about 1.5:1 to about 2.25:1, respectively.

12. A heat- and pressure-consolidated article prepared from a thermosetting urea-formaldehyde resinous composition and coated with a substantially insoluble and infusible adherent, stain-resistant coating comprising a thermoset resinous reaction product of (A) melamine, (B) formaldehyde, and (C) p-phenyl phenol, the mol ratio of said (A) to said (C) being from about 2:1 to about 1:2, respectively, and the mol ratio of said (B) to the total mols of said (A) and said (C) being from about 1.5:1 to about 2.25:1, respectively.

13. A heat- and pressure-consolidated article prepared from a thermosetting urea-formaldehyde resinous composition and coated with a substantially insoluble and infusible adherent, stain-resistant coating comprising a thermoset resinous reaction product of (A) melamine, (B) formaldehyde, and (C) p-t-butyl phenol, the mol ratio of said (A) to said (C) being from about 2:1 to about 1:2, respectively, and the mol ratio of said (B) to the total mols of said (A) and said (C) being from about 1.5:1 to about 2.25:1, respectively.

References Cited in the file of this patent
UNITED STATES PATENTS

| | | |
|---|---|---|
| 2,579,985 | Varela et al. | Dec. 25, 1951 |
| 2,816,085 | Anas et al | Dec. 10, 1957 |
| 2,826,559 | Updegraff et al. | Mar. 11, 1958 |

UNITED STATES PATENT OFFICE
CERTIFICATE OF CORRECTION

Patent No. 3,131,086

April 28, 1964

Arthur S. Nyquist et al.

It is hereby certified that error appears in the above numbered patent requiring correction and that the said Letters Patent should read as corrected below.

Column 2, line 27, for "tken" read -- taken --; column 9, line 3, for "describded" read -- described --; column 11, line 10, for "p-phenol" read -- p-phenyl phenol --.

Signed and sealed this 8th day of September 1964.

(SEAL)
Attest:

ERNEST W. SWIDER
Attesting Officer

EDWARD J. BRENNER
Commissioner of Patents